(12) United States Patent
McCoy

(10) Patent No.: US 6,415,476 B1
(45) Date of Patent: Jul. 9, 2002

(54) LOCKING DEVICES AND RELATED METHODS OF LOCKING

(76) Inventor: Kevin P. McCoy, 8996 Shadow Bluff, Denham Springs, LA (US) 70726

( * ) Notice: Subject to any disclaimer, the term of this patent is extended or adjusted under 35 U.S.C. 154(b) by 0 days.

(21) Appl. No.: 09/482,249

(22) Filed: Jan. 13, 2000

(51) Int. Cl.[7] .................................................. E05D 7/10
(52) U.S. Cl. ........................... 16/257; 16/224; 16/254; 16/260; 16/271
(58) Field of Search ............... 16/257, 258, 260, 16/261, 271, 254, 224; 24/115 L, 115 M, 136 A; 403/322.2, 322.1, 321, 56, 90; 70/459, 386

(56) References Cited

U.S. PATENT DOCUMENTS

| 406,730 | A | | 7/1889 | Harvie |
|---|---|---|---|---|
| 650,059 | A | | 5/1900 | Almonte |
| 1,045,891 | A | | 12/1912 | Robertson |
| 2,348,611 | A | * | 5/1944 | Davidson ............ 24/115 L |
| 3,061,137 | A | | 10/1962 | Svoboda et al. ......... 220/31 |
| 3,553,984 | A | | 1/1971 | Grumbach ............... 70/99 |
| 4,347,720 | A | | 9/1982 | Kenyon ................. 70/14 |
| 4,708,040 | A | * | 11/1987 | Erickson ............... 403/322 |
| 4,709,454 | A | * | 12/1987 | Barnes ................. 24/115 L |
| 4,858,952 | A | * | 8/1989 | Sasaki et al. ........... 280/802 |
| 4,893,810 | A | * | 1/1990 | Lee ..................... 24/115 L |
| 4,914,961 | A | * | 4/1990 | Wirth .................. 24/115 L |
| 5,173,991 | A | * | 12/1992 | Carswdell .............. 16/86 A |
| 5,442,941 | A | | 8/1995 | Kahonen et al. ........... 70/34 |

FOREIGN PATENT DOCUMENTS

SU        326123        *   2/1972   ................ 24/136 A

* cited by examiner

*Primary Examiner*—Chuck Y. Mah
(74) *Attorney, Agent, or Firm*—Sieberth & Patty, L.L.C.

(57) ABSTRACT

In one embodiment of the invention a locking device is provided, the device comprising a first movable object; a second movable object; and a housing, wherein the housing defines at least (i) a cavity, (ii) a first bore for receiving the first movable object, and (iii) a second bore which opens into the cavity and intersects with the first bore, and in which the second movable object is at least partially disposed; whereby upon movement of the first movable object into a locking position within the first bore, the second movable object is moved to a position in proximity or in contact with an abutting surface within the cavity. Related combinations of such devices, as well as releasable hinges and closures employing such configurations and related methods are also described.

37 Claims, 10 Drawing Sheets

LOCKING DEVICES AND RELATED METHODS OF LOCKING

TECHNICAL FIELD

This invention relates to locking devices and methods for locking.

BACKGROUND

Locking devices of many types are known. Many of these devices are directed to specific applications, limiting their usefulness in various other applications in which one object is to be secured to another. Further, many devices tend to have a high degree of complexity in moving parts, diminishing their overall utility. Accordingly, a need continues to exist for simple locking devices which may be employed in a broad variety of applications, while still providing a secure attachment of at least one object to another.

SUMMARY OF THE INVENTION

The present invention satisfies this and other needs in a surprisingly efficient and novel way by providing in one embodiment a locking device which is comprised of a few simple parts which are readily brought together and easily cooperate with one another to perform the functions required. The locking devices of this invention may be employed efficiently in a broad variety of applications, including but not limited to, simple door locks, easy-release trunk locks, releasable hinges, mechanical joints and automated versions of each of the foregoing.

One embodiment of this invention provides a locking device which comprises a first movable object, a second movable object, and a housing. The housing defines at least a cavity, a first bore for receiving the first movable object, and a second bore which opens into the cavity and intersects with the first bore. The second movable object is at least partially disposed in the second bore, and when the first movable object is moved into a locking position within the first bore, the second movable object is moved to a position in proximity or in contact with an abutting surface within the cavity. Preferably, the device further comprises biasing means for biasing the first movable object towards engagement with the first bore.

Another embodiment of this invention provides a locking device which comprises at least two first movable objects, at least two second movable objects, and a housing. The housing defines at least a cavity, a plurality of first bores for receiving, respectively, the first movable objects, and a plurality of second bores which open into the cavity and intersect with their respective first bores. The second movable objects are at least partially disposed in their respective second bores, and, when the first movable objects are moved into their respective locking positions within their respective first bores, at least two of the second movable objects are moved into proximity or into contact with one another.

Still another embodiment of this invention provides a releasable hinge which comprises a first movable object, a second movable object, a housing, and a pivotal member. The housing defines at least a cavity, a first bore for receiving the first movable object, and a second bore which opens into the cavity and intersects with the first bore. The second movable object is at least partially disposed in the second bore, whereby the pivotal member may be retained in the cavity while free to pivot relative to the housing when the first movable object is moved into a locking position within the first bore and the second movable object is thereby moved to a position in proximity or in contact with an abutting surface within the cavity. It will be appreciated that this hinge is releasable at the hinge pivot point and has as one of its advantages the feature of being comprised of a few simple parts while still proving useful in a broad variety of potential applications.

Yet another embodiment of this invention is a method for locking which comprises inserting a first movable object into a first bore defined by a housing. The housing further defines at least a cavity in which an abutting surface is provided, and a second bore which opens into the cavity and intersects with the first bore; a second movable object being at least partially disposed in the second bore. The method for locking further comprises causing the first object to contact the second object so as to move the second object into a position in proximity to or in contact with the abutting surface, and retaining the first object in a locking position within the first bore so as to retain the second object in the position in proximity to or in contact with the abutting surface.

Another embodiment of this invention provides a method for releasably hinging a first member to a second member, which method comprises (a) placing at least a portion of the first member into a cavity defined by a housing attached to the second member, (b) inserting a first movable object into a first bore defined by the housing, the housing further defining at least a second bore which opens into the cavity and intersects with the first bore and in which a second movable object is at least partially disposed, and (c) contacting the second movable object with the first movable object so as to place and retain the second movable object in a position in proximity or contact with an abutting surface within the cavity so that the first member is releasably retained in the cavity while remaining free to pivot relative to the housing.

These and other embodiments, objects and features of this invention will be still further apparent from the ensuing description, appended claims, and accompanying drawings.

BRIEF DESCRIPTION OF THE DRAWINGS

In the figures, like letters and/or numerals are used to refer to like or functionally like parts among the figures.

DETAILED DESCRIPTION OF PREFERRED EMBODIMENTS

It will now be appreciated that the devices of this invention may be in a wide variety of applications and configurations. For example, devices of this invention may be used side by side for continuous hinging or fastening, back to back for double end locking applications, face to face to attach to a common part for multiple pivot points, or in triangular, square or circular patterns, for example. In face to face configurations, rubber grommets or mechanical dampers may be employed between the devices to make a life-like joint for robotic limbs, digits, etc. Moreover, the devices of this invention are not hindered by the weightlessness of space. In addition, the device allows for quick assembly and disassembly of structural components in numerous industries. For example, these devices may be employed in the automotive industry as connecting components for chassis, steering mechanisms, tie rods, etc. Vehicle components such as seats and dashboards may be made to have quick-release attributes as a result of the device of this invention. When used for attaching trunk lids, an easy access trigger mechanism, described hereinafter, may be used as a quick release. The locking device may also be applied to seat belts or door locks, as well as hitching devices for different types of vehicles and towing. In another application, the devices may be used to lock down goods during transportation on, e.g., trucks, trailers, etc. in place of chain or cable hooks. In another back to back configuration, the devices may be used with a conventional turnbuckle between them to provide a quick release. They can also replace yoke and Pin and shackles, enabling quick release under pressure. Master links or chain links may also be replaced with these devices to provide easy connection and disconnection. Access panels on enclosures for computers, generators, compressors and other equipment can be secured by these devices while allowing for quick opening, closing and removal without tools. Devices of this invention also may be activated and monitored by a central control panel. Such a configuration could prove most useful in jail cell construction, using the control panel to lock and unlock the cells from a remote location. Aircraft latches and compartments may also be equipped with devices of this invention.

For the household consumer, these devices may also replace standard hinges and locking devices to enable easy removal and attachment of, e.g., refrigerator doors to either the left or right hand side. Oven doors may also be attached using devices of this invention, to enable easy door disconnection and re-attachment. These devices may also provide a safety release in the event a child is trapped within an abandoned appliance. The devices of this invention may also replace conventional fasteners for furniture components, making assembly and disassembly easier because of the absence of loose hardware.

Figure 1:
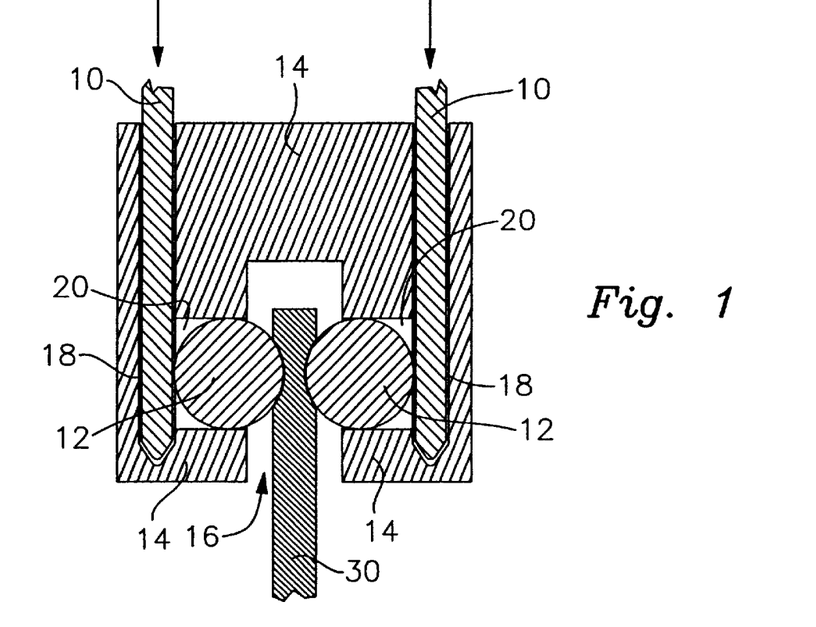
FIG. 1 is a view in cross-section of one preferred embodiment of this invention.
Figure 2:
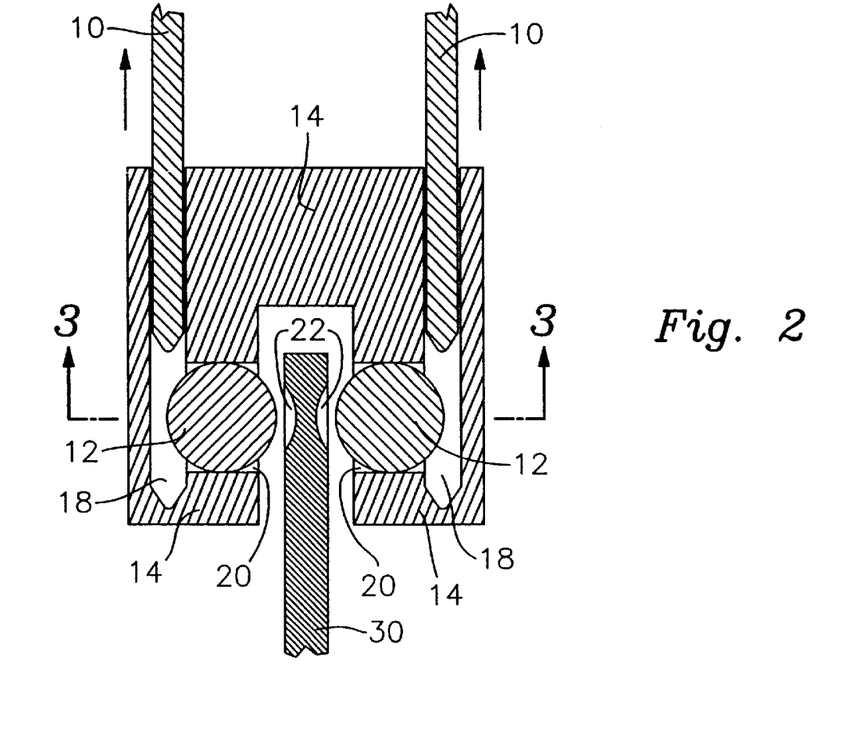
FIG. 2 is a modified version of FIG. 1, illustrating movement of component parts of the device of FIG. 1.
Figure 3:
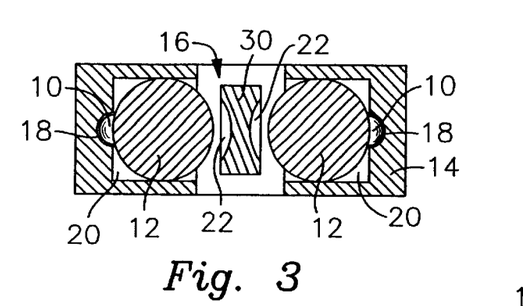
FIG. 3 is a view in cross-section taken along lines 3—3 of FIG. 2.

The accompanying figures depict for illustration purposes certain particularly preferred embodiments of the present invention. With reference to FIGS. 1, 2 and 3, the locking device depicted is comprised of two movable objects in the form of elongate members, namely pins 10,10, two movable objects in the form of a sphere, namely ball bearings 12,12, and a housing 14. Housing 14 further defines a cavity 16, two first bores in the form of bores 18,18 for receiving respectively pins 10,10, and two second bores in the form of bores 20,20 which open into cavity 16 and intersect respectively with bores 18,18 in substantially perpendicular fashion. As can be seen from the figures, bearings 12,12 are at least partially disposed respectively within bores 20,20. When pins 10,10 are received respectively by bores 18,18, bearings 12,12 are moved to a position which is either proximate to or in contact with two respective abutting surfaces 22,22 in cavity 16. Each abutting surface 22 in the preferred embodiment depicted defines an indentation conforming to the shape of at least a portion of one of bearings 12,12, surface 22 itself being defined by a dimpled flange 30.

FIG. 1 illustrates with arrows the direction in which pins 10,10 are moved to be placed in fully engaged position, bearings 12,12 each being in contact with a corresponding abutting surface 22, while FIG. 2 illustrates with arrows the direction in which pins 10,10 are moved to be in fully disengaged position to permit removal of flange 30 from cavity 16. In this way, flange 30 is locked to housing 14 when pins 10,10 are inserted into bores 18,18 so as to move bearings 12,12 into locking proximity or contact with flange 30. As bearings 12,12 come into contact with and are received by their respective abutting and form-fitting surfaces, they interlock so as to inhibit removal of flange 30 from cavity 16.

Figures 1A, 2A, 7, 8:
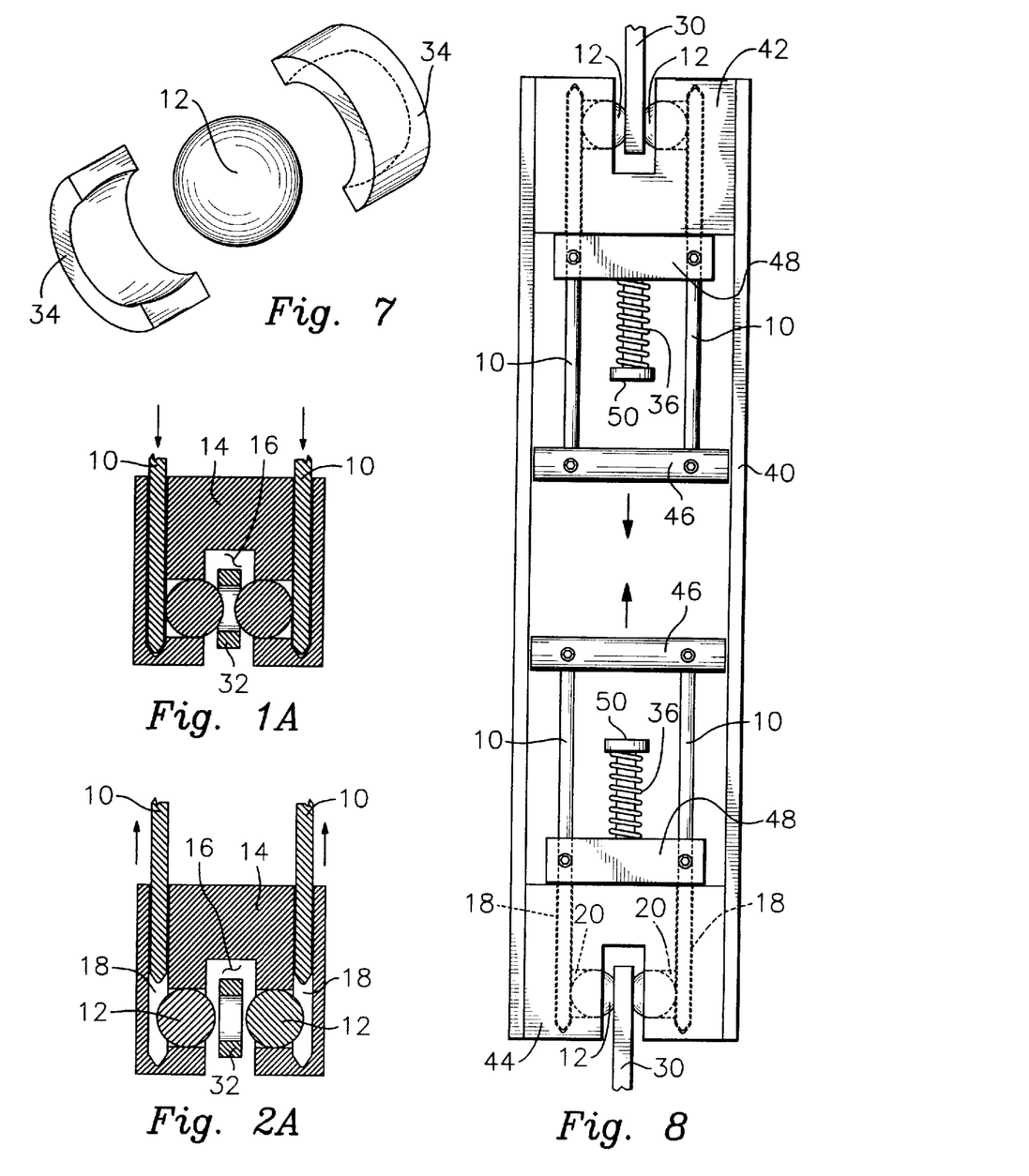
FIG. 1A is the same as FIG. 1, with the exception that FIG. 1A illustrates a different object being locked into place.
FIG. 2A is a modified version of FIG. 1A, illustrating movement of component parts of the device of FIG. 1A.
FIG. 7 is an elevated, exploded view in perspective of three component parts of a preferred embodiment of this invention.
FIG. 8 is a top view in perspective of another preferred embodiment of this invention.
Figure 4:
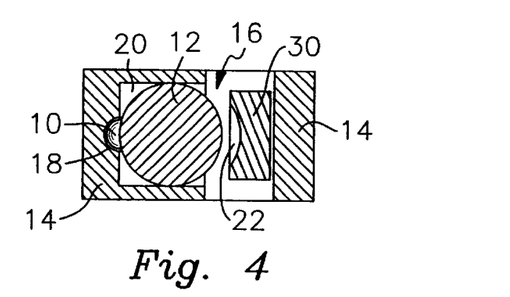
FIG. 4 is a modified version of FIG. 3 illustrating another preferred embodiment of this invention.
Figure 5:
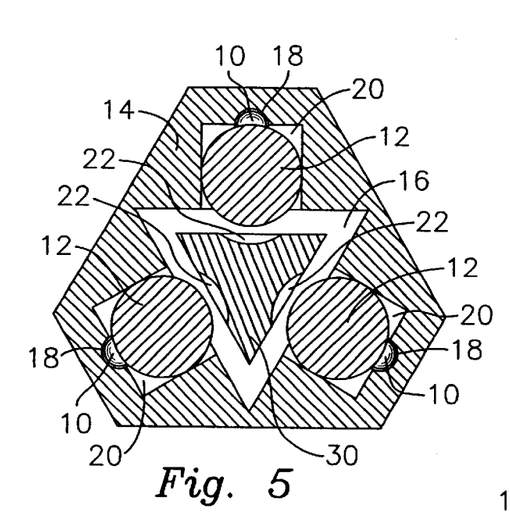
FIG. 5 is another modified version of FIG. 3 illustrating yet another preferred embodiment of this invention.
Figure 6:
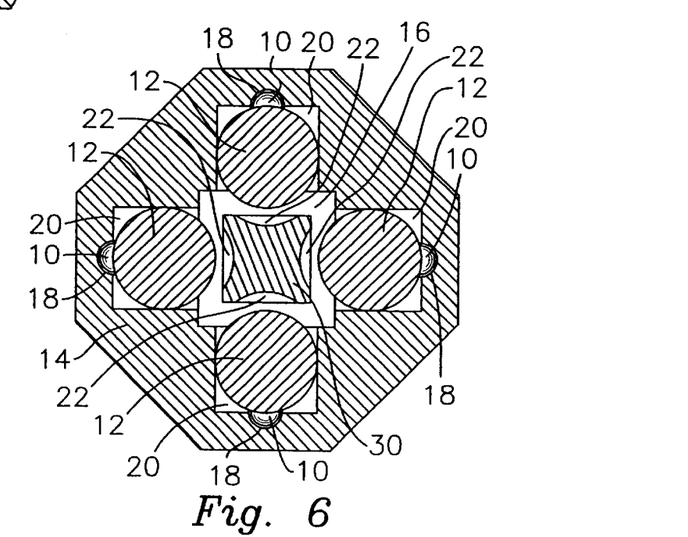
FIG. 6 is another modified version of FIG. 3 illustrating still another preferred embodiment of this invention.

It should be appreciated that, in alternative embodiments, the abutting surface towards which the bearings move may alternatively be (1) one or more apertures in the flange being locked, the apertures being of sufficient diameter to receive at least a portion of the bearings, or (2) the surface of an opposing ball bearing (as depicted in FIG. 1A), or (3) merely a surface of the cavity wall which defines cavity 16. These variations in the device depicted are possible in view of the fact that only one bore for receiving the elongate movable pin and one bore for receiving at least a portion of the spherical movable ball bearing are required to provide either a locking engagement or barrier to prevent removal of items from within the cavity, while a plurality of both types of bores (and their associated pins and bearings) is contemplated by and is within the scope of this invention. Thus, modifications to the device of FIGS. 1, 2 and 3 having a single or a plurality of bores, pins and bearings are illustrated in FIGS. 4, 5 and 6. As may be seen with reference to those figures, while dimpled flange 30 of FIGS. 1–3 defines bilateral dimples, the flange may define only one dimple, as seen in FIG. 4, or more than two dimples, as seen in FIGS. 5 and 6.

Moreover, in other alternative embodiments, no flange is required. Rather, as may be seen from FIGS. 1A and 2A, an item to be locked in place, such as, e.g., a ring 32, may be placed in locked relationship with housing 14 simply by placing ring 32 in cavity 16 and engaging pins 10,10 with bores 18,18 to bring bearings 12,12 towards one another sufficiently to inhibit removal of ring 32 from cavity 16. As with flange 30 in FIGS. 1–3, ring 32 in FIGS. 1A and 2A is merely the object being locked into place, and the character of that object is no limitation of the present invention, so long as removal of the flange, ring or other object from the housing cavity is inhibited when the device is in locked position.

In a particularly preferred embodiment of this invention, when the second moveable object is a ball bearing, each bearing is supplemented with a two-part fitting comprised of two cylindrical, hollowed out fitting halves 34 (FIG. 7 only) which combine to surround the respective bearing and provide a larger surface area for contact between the bearing and the housing surface(s) which define the respective bore 20. Another alternative embodiment may employ a second moveable object having a shape which is not completely spherical but which is consonant with the shape of the bearing/fitting combination illustrated in FIG. 7. In either case, it is believed that the increased surface area, if necessary, provides even more useful life to this second movable object component of the locking device.

As seen in FIG. 8, another preferred embodiment of this invention is apparatus employing a combination of two locking devices as described above, each of locking device components being further equipped with biasing means in the form of a spring 36. The dual locking apparatus illustrated is comprised of a housing frame 40 which includes two lock housing portions 42 and 44. Each housing portion 42 and 44 defines respective bores 18,18 and 20,20, and each bore 18 is sized and configured to receive a respective pin 10. Pins 10 are bound together in pairs through a handle 46 and a thrust plate 48. A bolt 50 extends from each of portions 42 and 44, each bolt 50 having spring 36 disposed thereupon. Each spring 36 biases against its respective thrust plate 48 to urge the associated pair of pins 10 into effective engagement with their respective bores 18,18, thereby driving and retaining bearings 12,12 into locking position with corresponding flange 30. When handles 46 are moved in the direction of the illustrated arrows of FIG. 8, pins 10 are disengaged from housing portions 42 and 44 and each ball bearing 12 becomes free to disengage the associated abutting surface defined by the associated flange 30. Of course, upon release of handles 46 by a user, each pin 10 is urged by the accompanying spring 36 back into bore-engaged position to reactivate the locking mechanism.

Figure 9:
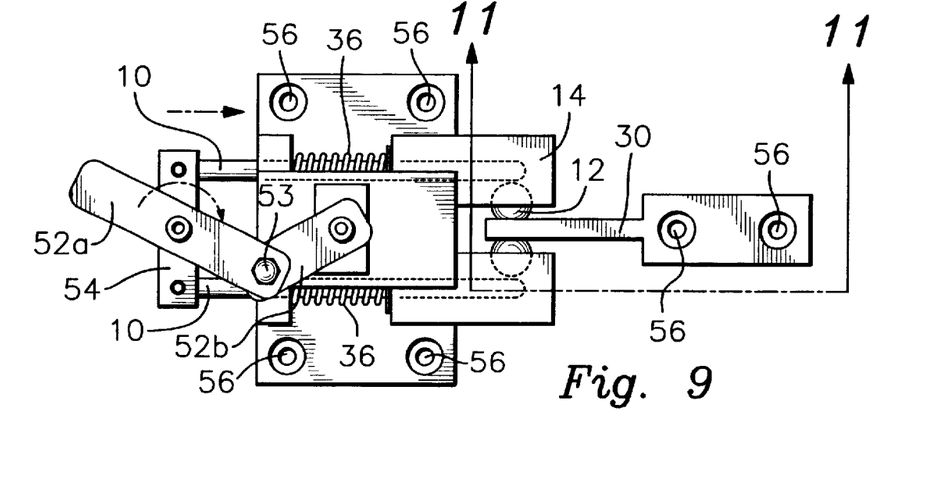
FIG. 9 is a top view in perspective of another preferred embodiment of this invention.
Figure 10:
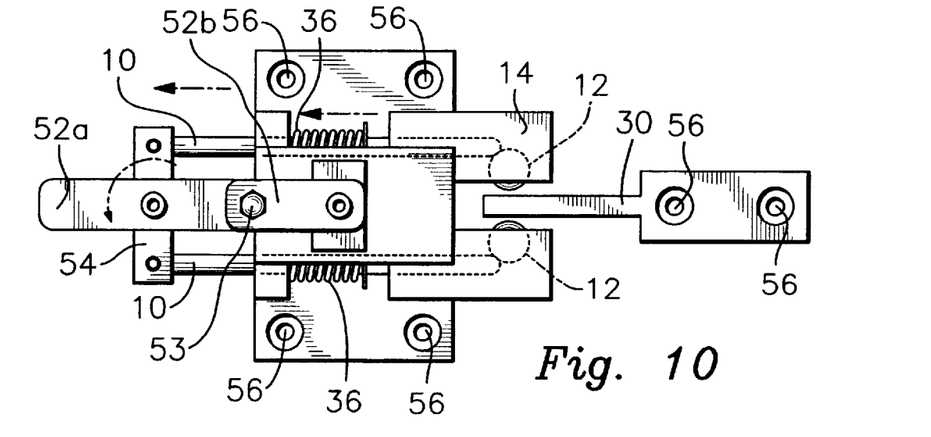
FIG. 10 is a top partially phantom view in perspective of the device of FIG. 9.
Figure 11:
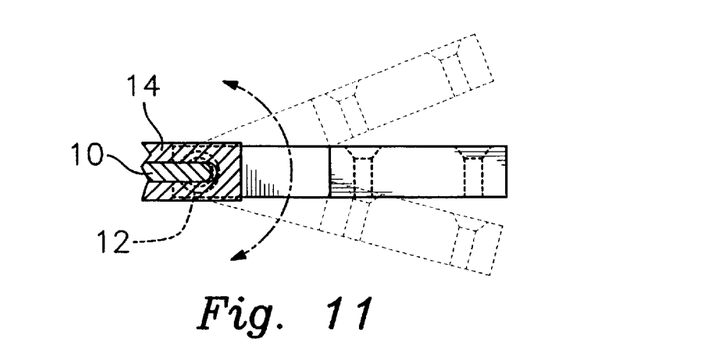
FIG. 11 is a side, cross-sectional view of the device of FIG. 9, broken away, and taken along lines 11—11 in FIG. 9.

In FIGS. 9–12, a preferred releasable hinge of this invention is illustrated. With particular reference to FIGS. 9–11, it may be seen that the hinge is comprised of a housing 14; two pins 10,10; two bearings 12,12; two springs 36,36; a pivot arm comprised of two arm portions 52a and 52b which are pivotally attached to one another by a pin 53, the pivot arm as a whole being pivotally attached at one end to housing 14 and at the other end to a bridge 54 connecting corresponding ends of pins 10,10 together; and a bilaterally dimpled flange 30. Arrows in FIG. 9 illustrate pivot arm portion 52a and pin 10 movement which occurs when the device is activated to bind flange 30 to housing 14, while arrows in FIG. 10 illustrate movement of the same components to deactivate the lock to permit release of flange 30 from housing 14. FIG. 11 includes arrows illustrating hinge movement of flange 30 relative to housing 14 enabled while the lock is activated as in FIG. 9. Each of housing 14 and flange 30 define screw apertures 56 which permit them to be attached to other objects, e.g., doors or door frames, enabling the device to provide a releasable hinge there between. Users of the hinge quickly connect and release the hinge simply by pivoting pivot arm portion 52a in either of the directions indicated in FIGS. 9 and 10. Springs 36,36 bias pins 10,10 into engaged and locking position unless the pivot arm is positioned as in FIG. 10 to withdraw pins 10,10 from housing 14 by its connection to pins 10,10 through bridge 54.

Figure 12:
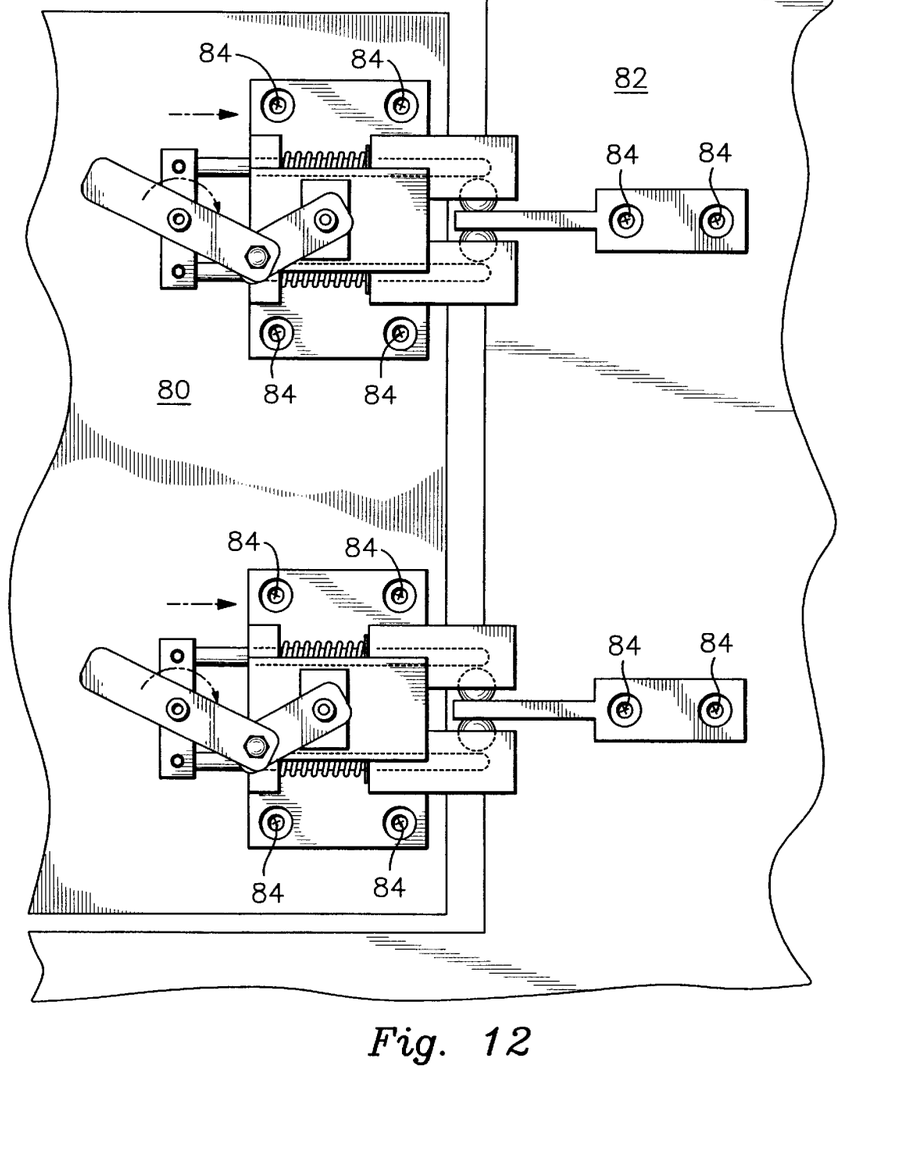
FIG. 12 is a top broken away view in perspective of a door equipped with two of the devices of FIG. 9.

FIG. 12 illustrates two devices according to FIGS. 9–11 applied to hinge a door 80 to a door frame 82, each device being attached to door 80 with screws 84. As will now be appreciated, the releasable hinges of this invention enable doors to be hinged to frames quickly, while also enabling the hinge connect to be quickly released to remove the door from the frame. These devices also enable hatch doors, for example, to be rigidly attached to a surrounding frame or wall in an opening there through, while at the same time enabling the door to be swung open selectively about different hinge pivot axes provided by any one or more of the hinge devices disposed around the perimeter of the door.

Figure 13:
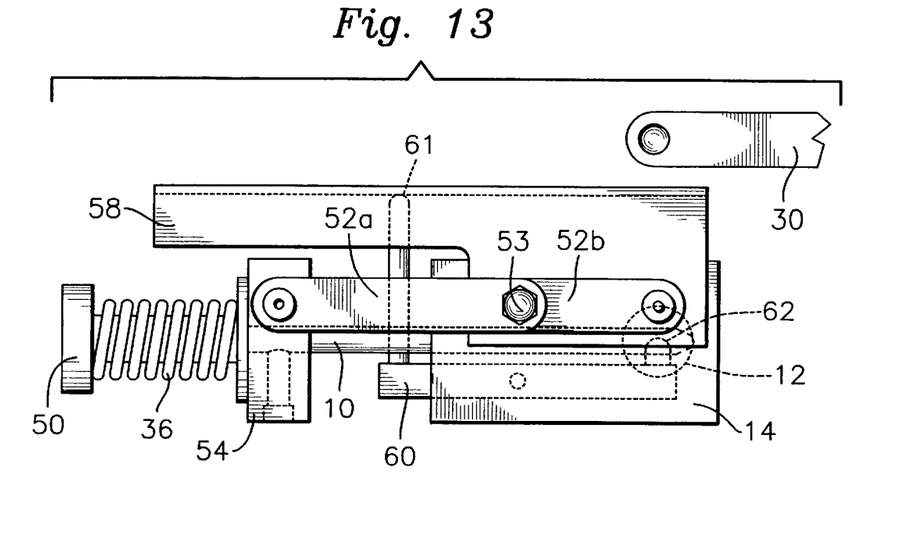
FIG. 13 is a side view in perspective of another preferred embodiment of this invention.
Figure 14:
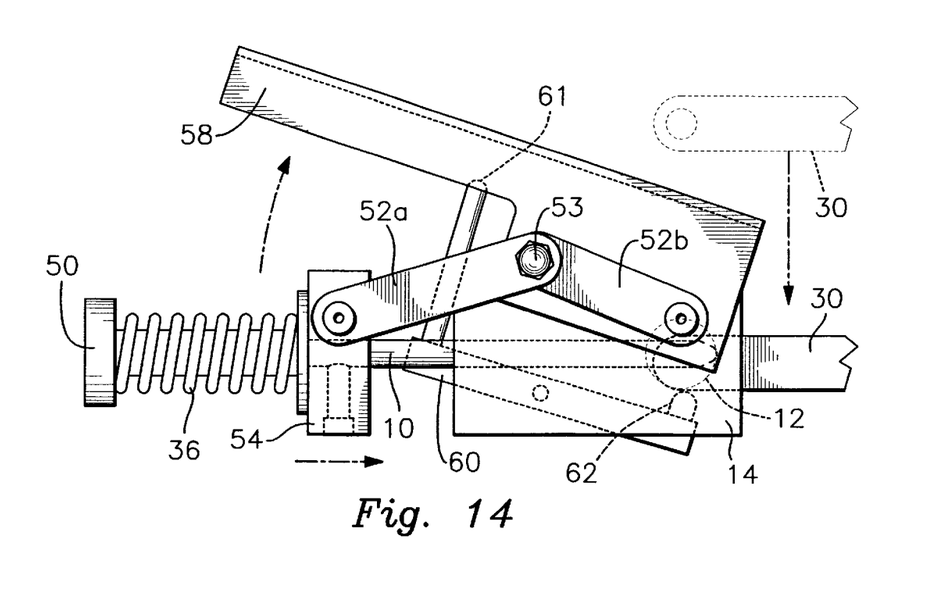
FIG. 14 is another side partially phantom view in perspective of the device of FIG. 13.

Yet another preferred embodiment of this invention is depicted in FIGS. 13 and 14. There, a trigger lock is illustrated. The trigger lock is comprised of a housing 14; two pins 10,10 (only one viewable); two bearings 12,12 (only one viewable); a spring 36; a pivot arm comprised of two arm portions 52a and 52b which are pivotally attached to one another by a pin 53, the pivot arm being pivotally attached at one end to housing 14 and at the other end to a bridge 54 which connects corresponding ends of pins 10,10 together; a bolt 50 which extends through spring 36 and bridge 54 and is attached to housing 14; and a bilaterally dimpled flange 30. The trigger lock is further comprised of a buckle plate 58 pivotally attached to housing 14 and connected to arm portion 52b so as to move in unison therewith. The lock is also provided with a substantially L-shaped pivot bar 60 which is pivotally attached to housing 14 and includes at one end a stub 62 which extends into a cavity 16 (not shown in FIGS. 13 and 14) defined by housing 14. When flange 30 is inserted into cavity 16 (as in the other figures) and contacts stub 62 so as to pivot bar 60, an end 61 of bar 60 may contact buckle plate 58 to thereby pivot plate 58 and arm 52b relative to housing 14, breaking down the pivot arm to permit spring 36 to bias bridge 54 toward housing 14 and to bias pins 10,10 into lock-activating engagement with housing 14. Upon engagement with housing 14, pins 10,10 cause bearings 12,12 to approach or contact the indentations provided in flange 30 and to bind flange 30 within cavity 16 of housing 14. To release flange 30 from housing 14, buckle plate 58 may be pivoted back into release position illustrated in FIG. 14, thereby pivoting pivot arm and causing bridge 54 to withdraw pins 10,10 from housing 14, releasing bearings 12,12 from locking engagement with the indentations of flange 30.

Figure 15:
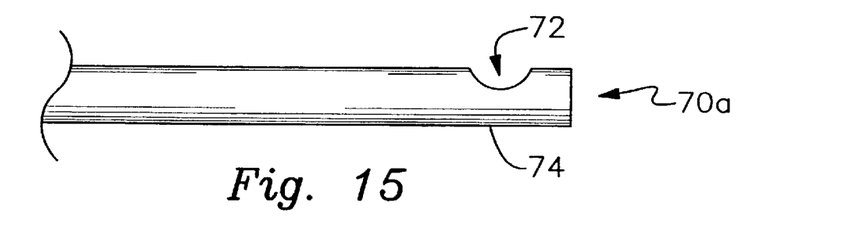
FIG. 15 is a side plan view of an alternative component of the devices of this invention, broken away.
Figure 16:
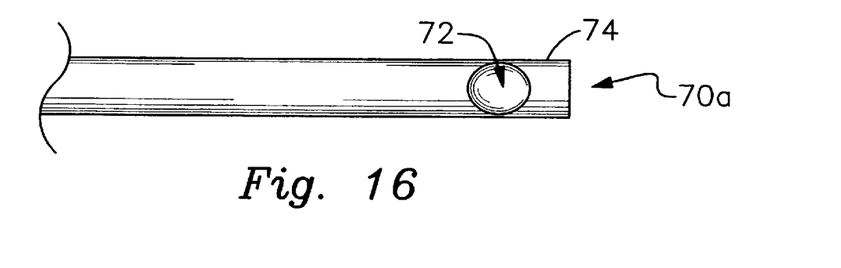
FIG. 16 is a top plan view of the component of FIG. 15.

Pin 70a shown in FIGS. 15 and 16 is an alternative first movable object for use in devices of this invention. Pin 70a is characterized in that it defines a recess 72 which accommodates the second movable object in the device, namely one of ball bearings 16 of the preferred embodiments depicted in the figures. When pin 70*a* is engaged with or disengaged from bore 18 in housing 14 (which are seen, e.g., in FIG. 1), one of ball bearings 12 (seen in FIG. 1, for example) may be received by recess 72 which brings the bearing out of proximity to an abutting surface. When pin 70*a* is sufficiently moved, either through rotation of pin 70*a* about the longitudinal axis of pin 70*a* or through sliding engagement or disengagement of pin 70*a* with bore 18 in substantially parallel fashion to the longitudinal axis of pin 70*a*, bearing 12 of preferred devices of this invention may no longer be received by recess 72, so that bearing 12 is placed back in proximity or contact with the abutting surface within the housing cavity through its contact with a non-recessed outer surface 74 of pin 70*a*.

Figure 17A:
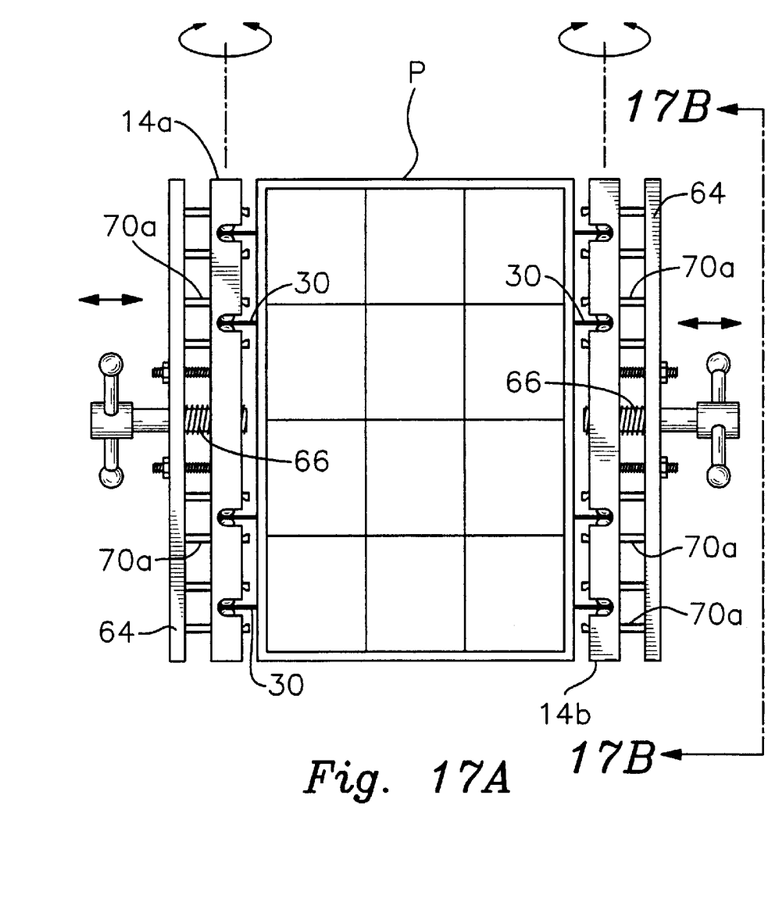
FIG. 17A is a side view in perspective of another embodiment of this invention.

FIG. 17A is an elevated view in perspective of another embodiment of this invention, in which multiple releasable hinges are provided to enable a doorway or platform P to be rigidly yet detachably and pivotally attached to two opposing housings 14*a* and 14*b*. Platform P may be detached from either or both of housings 14*a* and 14*b* through the displacement of a respective bridge 64 to which a plurality of pins 70*a* are attached. Each bridge 64 is brought away from or toward its respective housing 14*a* or 14*b*, as applicable, through a threaded drive shaft 66 which when rotated causes bridge 64 to move relative to its respective housing 14*a* or 14*b* as indicated by the associated arrows in FIG. 17A. This movement of bridge 64 in turn moves each pin 70*a* within its associated bore 18 enough to move bearings within housings 14*a* and 14*b* and activate or deactivate the lock of the associated bi-laterally dimpled flange 30. When one or the other side of platform P is attached to the respective housing while the other is detached, platform P may pivot about one of the hinge axes indicated with broken lines in FIG. 17A in the directions indicated by arrows about those axes. Of course, platform P may be removed entirely by detaching both sides from their proximate housing 14*a* or 14*b*, as applicable. When both sides are attached to their proximate housing 14*a* or 14*b*, platform P is rigidly retained in position between housings 14*a* and 14*b*. This configuration provides a number of useful applications, including for example removable vertical doorways which are releasably hinged on alternative sides, and horizontal platforms which may be removed or pivotally hinged upwardly or downwardly on alternative sides.

Figure 17B:
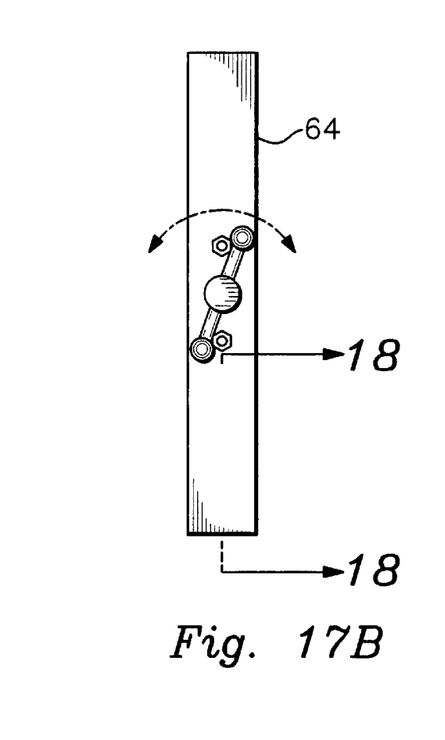
FIG. 17B is a different side view of the device of FIG. 17A taken from line of sight 17B—17B in FIG. 17A.
Figure 18:
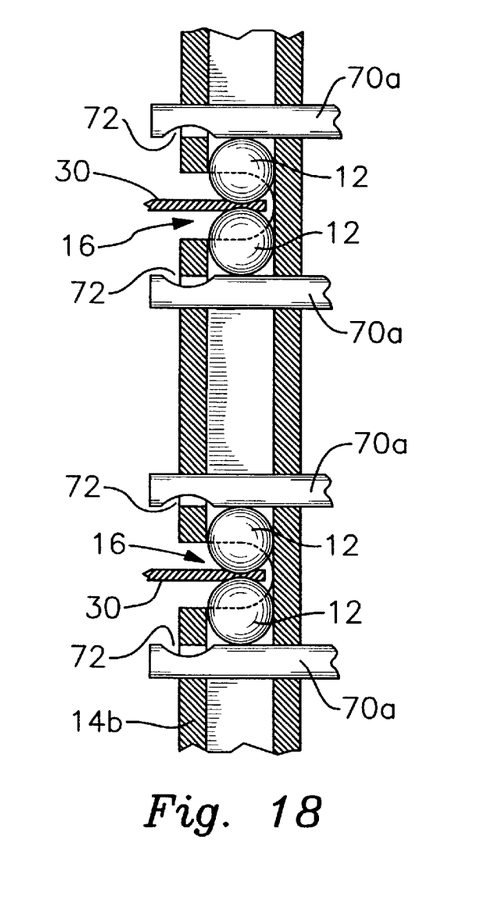
FIG. 18 is a side view of a component of the device in FIG. 17A, taken in cross-section along line 18—18 of FIG. 17B and broken away.
Figure 19A:
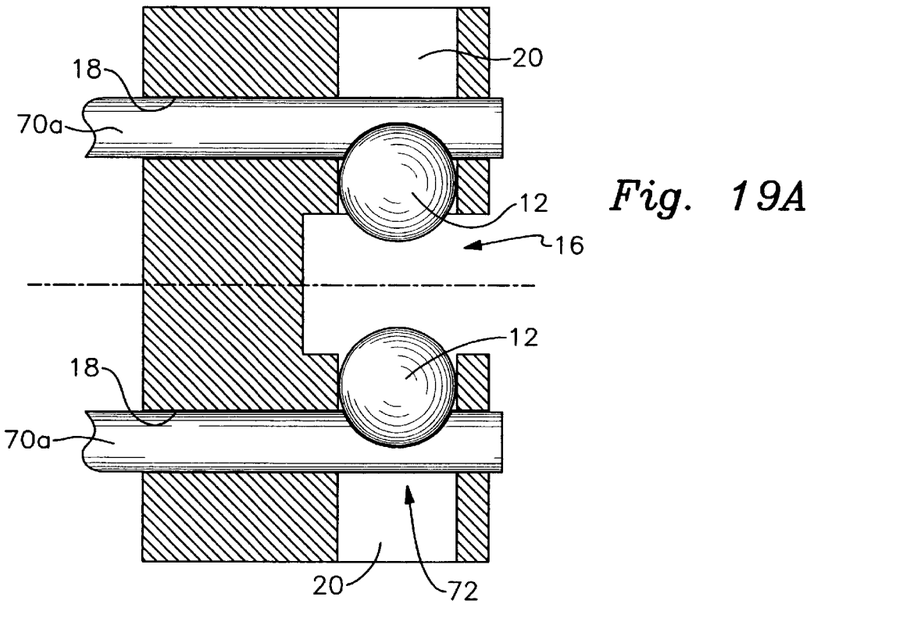
FIG. 19A is a side view, in cross-section, of another alternative embodiment of this invention, partially broken away and in an unlocked position.
Figure 19B:
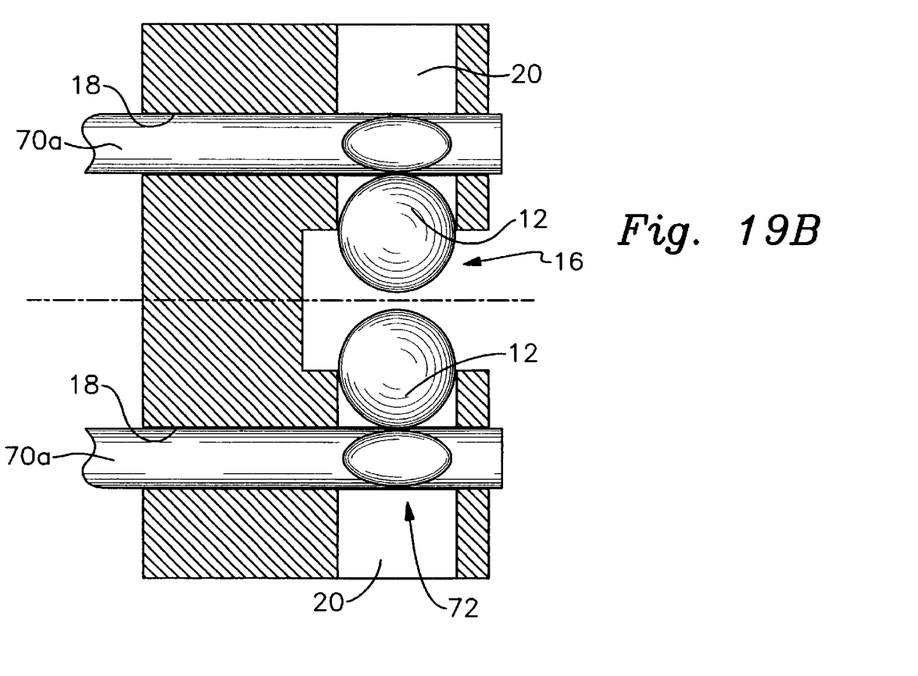
FIG. 19B is a side view, in cross-section, of the embodiment of FIG. 19A, partially broken away and in a locked position.

FIG. 18 illustrates a cross-section of housing 14*b* as shown with reference to FIG. 17B, to illustrate how pins 70*a* are configured to interact with bearings 12 to bring the locking device into and out of locked position. Each recess 72 provides a space into which a corresponding bearing 12 may fit to place the locking mechanism in an open position. When pins 70*a* are sufficiently engaged or disengaged, the corresponding bearings 12 is displaced into cavity 16 to bring the locking mechanism into a closed or locked position. In another embodiment, the device of FIG. 17A may be configured to rotate, rather than insert or extract, each pin 70*a* in the respective bore 18, to place the locking mechanism into and out of locked position. Such a configuration may be seen with reference to FIGS. 19A and 19B, wherein the difference in ball bearing position is shown. FIG. 19A shows pins 70*a* rotated to receive bearings 12 so as to be placed in an open, unlocked position, while FIG. 19B illustrates pins 70*a* rotated into a closed locked position, thereby bringing the corresponding bearings 12 closer to the center (seen as broken line in FIGS. 19A and 19B) of cavity 16.

Figure 20A:
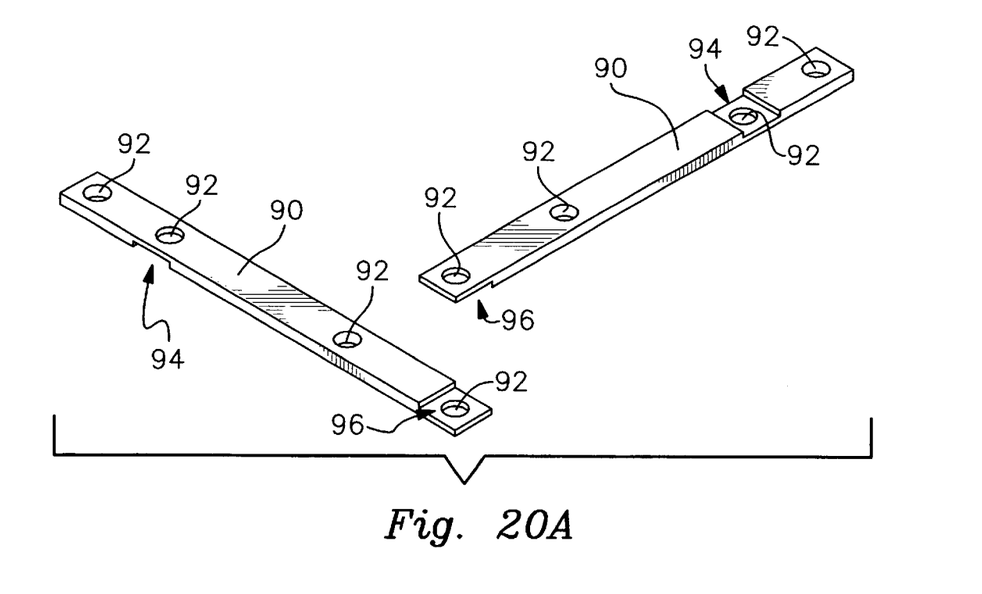
FIG. 20A is an elevated view in perspective of two flat bars capable of being locked together by a device of this invention.
Figure 20B:
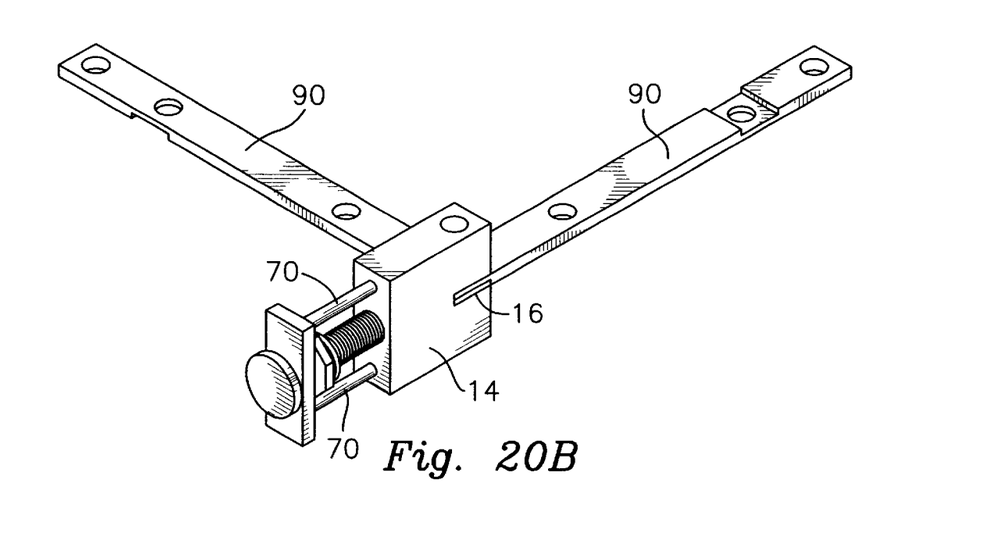
FIG. 20B is an elevated view in perspective of the device of FIG. 1 in use to connect the flat bars of FIG. 20A.

FIGS. 20A and 20B illustrate the use of a device of this invention to connect at least two flat bars 90,90 which define a plurality of apertures 92. Each bar 90 further defines two notches 94 and 96, each notch being aligned with one aperture 92. Through this configuration, the bars 90,90 may be connected to one another in a particular sturdy fashion by aligning one notch 94 or 96 from one bar 90 with another notch 94 or 96 in the other bar 90, and then locking the bars together with a locking device as depicted in FIG. 1. As seen with specific reference to FIG. 20B, each notch 96 on the respective bars 90,90 are brought into engagement with one another and placed into cavity 16 of housing 14, and the locking device is applied to lock the bars in place. As depicted, the portions of housing 14 which define cavity 16 act to prevent rotation of bars 90,90 relative to housing 14, while the engagement of notches 96 with one another also prevents bars 90,90 from pivoting relative to one another. Of course, those of skill in the art will appreciate that, alternatively, each bar 90 may be individually locked into housing 14 by placement of the locking device upon the bar at any one of apertures 92. Of course, it will also now be appreciated that the locking device may be attached to one or more of bars 90,90 and each bar 90 may be configured with aperture diameters so as to permit bar 90 to pivot about the center of the aperture 92 which receives the bearings of the locking device, if such a pivot relationship to the housing is desired.

Generally, the housing in devices of this invention may take virtually any physical form, so long as the housing defines at least the cavity and bores described herein and provides sufficient rigidity to permit the device to function as intended. Those of skill in the art will of course appreciate that the housing also may be configured to be anchored or otherwise attached to yet another object, if desired. With reference to the first and second movable objects described herein, it will be appreciated that these objects are "movable" in that their position relative to the housing of the locking device may be changed. Moreover, the first movable object of this invention may be comprised of any object which at least may be received by the first bore and employed to contact and move the second movable object, but the first movable object is preferably an elongate member, and more preferably a pin. More preferably, the pin has a tapered end which comes into contact with the second movable object during operation of the device. Alternatively, the pin may have a blunt end and a recess as illustrated in FIGS. 15 and 16 to receive at least a portion of the second movable object when the pin is rotated within or inserted into the first bore.

Likewise, the second movable object of this invention may be comprised of any object which at least may be received by the second bore and employed to interact with the first movable object so as to move into proximity or contact with the abutting surface. Preferably, the second movable object is spherical in shape, and most preferably is a ball bearing.

The biasing means of this invention may be comprised of any device, object or system which achieves the desired biasing of the first movable object towards engagement with the first bore. Suitable non-limiting examples would include mechanical, hydraulic, pneumatic, electrical or electromagnetic means, such as threaded drive shafts, springs, levers, cams, gears, clamps, buckles, pneumatic rams, hydraulic rams, electromagnets and any combination of two or more of the foregoing. However, in preferred embodiments of this invention, the biasing means is comprised of mechanical means, with at least one spring or at least one threaded drive shaft being particularly preferred.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law. In the ensuing claims, means-plus-function clauses are intended to cover the structures described herein as performing the cited function and not only structural equivalents but also equivalent structures.

That which is claimed is:

1. A locking device which consists essentially of a first movable object; a second movable object; and a housing, wherein the housing defines at least
   (i) a cavity,
   (ii) a first bore for receiving the first movable object, and
   (iii) a second bore which opens into the cavity and intersects with the first bore, and in which the second movable object is at least partially disposed;
      whereby upon movement of the first movable object into a locking position within the first bore, the second movable object is caused to be moved to a position in proximity or in contact with an abutting surface within the cavity.

2. A device according to claim 1 wherein the first movable object comprises an elongated member.

3. A device according to claim 1 wherein the second movable object is spherical.

4. A device according to claim 1 wherein the abutting surface defines an indentation conforming to the shape of at least a portion of the second movable object.

5. A device according to claim 1 wherein the abutting surface is formed by the housing.

6. A device according to claim 1 wherein the second movable object is moved to a position in contact with the abutting surface.

7. A device according to claim 1 further comprising biasing means for biasing the first movable object towards engagement with the first bore.

8. A device according to claim 7 wherein the biasing means comprises mechanical means for biasing the first movable object towards engagement with the first bore.

9. A device according to claim 8 wherein the mechanical means comprises a spring.

10. A device according to claim 7 further comprising a trigger which causes the biasing means to bias the first movable object towards engagement with the first bore when an item to be locked is disposed within the cavity so as to actuate the trigger.

11. Apparatus which comprises a combination of at least two devices of claim 1.

12. A locking device which comprises at least three first movable objects, at least three second movable objects, and a housing, wherein the housing defines at least
   (i) a cavity,
   (ii) at least three first bores for receiving, respectively, the first movable objects, and
   (iii) at least three second bores which open into the cavity and intersect with the first bores, respectively, and in which the second movable objects are at least partially disposed, respectively;
      whereby upon movement of the first movable objects into respective locking positions within their respective first bores, the second movable objects are caused to be moved into proximity or into contact with one another.

13. A device according to claim 12 herein at least one of the first movable objects comprises an elongated member.

14. A device according to claim 12 wherein at least one of the second movable objects is spherical.

15. A device according to claim 12 further comprising biasing means for biasing at least one of the first movable objects towards engagement with its respective first bore.

16. A device according to claim wherein at least one of the first movable objects comprises an elongated member and at least one of the second movable objects is spherical, and wherein each of the first movable objects is inserted into its respective first bore by movement of the first movable object in a direction substantially parallel to its imaginary longitudinal axis so as to be placed in locking position.

17. A device according to claim 15 wherein at least one of the first movable objects comprises an elongated member and at least one of the second movable objects is spherical, and wherein each of the first movable objects is rotated about its imaginary longitudinal axis within its respective first bore so as to be placed in locking position.

18. A releasable hinge which comprises a first movable object, a second movable object, a housing, and a pivotal member, wherein the housing defines at least
   (i) a cavity,
   (ii) a first bore for receiving the first movable object, and
   (iii) a second bore which opens into the cavity and intersects with the first bore, and in which the second movable object is at least partially disposed;
      whereby the pivotal member may be retained in the cavity while free to pivot relative to the housing when the first movable object is moved into a locking position within the first bore and the second movable object is thereby moved to a position in proximity or in contact with an abutting surface within the cavity.

19. A device according to claim 18 wherein the first movable object comprises an elongated member.

20. A device according to claim 18 wherein the second movable object is spherical.

21. A device according to claim 18 wherein the abutting surface defines an indentation conforming to the shape of at least a portion of the second movable object.

22. A device according to claim 18 wherein the pivotal member forms the abutting surface.

23. A device according to claim 18 further comprising biasing means for biasing the first movable object towards engagement with the first bore.

24. Apparatus which comprises a combination of at least two devices of claim 18

25. A closure which comprises a door and two or more hinges according to claim 18 disposed about the periphery of the door.

26. A method for selectively rotating a door of a closure according to claim 25 about a desired imaginary hinge axis, which method comprises
   a) releasing all of the pivotal members from all of the hinges except for the pivotal member(s) retained by the hinge(s) most proximate to the desired hinge axis, and
   b) rotating the door about the desired hinge axis.

27. A method for locking which comprises:
   a) inserting a first movable object into a first bore defined by a housing, the housing further defining at least (i) a cavity in which an abutting surface is provided, and (ii) a second bore which opens into the cavity and intersects with the first bore and in which a second movable object is at least partially disposed;

b) causing the first object to contact the second object so as to move the second object into a position in proximity or in contact with the abutting surface at an indendation therein, the indentation conforming to the shape of at least a portion of the second movable object; and c) retaining the first object in a locking position within the first bore so as to retain the second object in the position in proximity or in contact with the abutting surface.

28. A method according to claim 27 herein the first movable object comprises an elongated member.

29. A method according to claim 27 wherein the second movable object is spherical.

30. A method according to claim 27 wherein the abutting surface is formed by the housing.

31. A method according to claim 27 herein the second movable object is moved to a position in contact with the abutting surface.

32. A method for releasably hinging a first member to a second member, which method comprises a) placing at least a portion of the first member into a cavity defined by a housing attached to the second member;

b) inserting a first movable object into a first bore defined by the housing, the housing further defining at least a second bore which opens into the cavity and intersects with the first bore and in which a second movable object is at least partially disposed; and c) contacting the second movable object with the first movable object so as to place and retain the second movable object in a position in proximity or contact with an abutting surface within the cavity so that the first member may be releasably retained in the cavity while remaining free to pivot relative to the housing.

33. A method according to claim 32 wherein the first movable object comprises an elongated member.

34. A method according to claim 32 wherein the second movable object is spherical.

35. A method according to claim 32 wherein the pivotal member forms the abutting surface.

36. A locking device which is comprised of a first movable object; a second movable object; and a housing, wherein the housing defines at least (i) a cavity, (ii) a first bore for receiving the first movable object, and (iii) a second bore which opens into the cavity and intersects with the first bore, and in which the second movable object is at least partially disposed;

whereby upon movement of the first movable object into a locking position within the first bore, the second movable object is caused to be moved to a position in proximity or in contact with an abutting surface within the cavity defined by the housing; and wherein the abutting surface has an indentation conforming to the shape of at least a portion of the second movable object.

37. A method for locking which comprises:

a) inserting at least three first movable objects into at least three respective first bores defined by a housing, the housing further defining at least (i) a cavity in which one or more abutting surfaces is provided, and (ii) at least three respective second bores which each open into the cavity and intersect with a respective one of the first bores and in which at least three second movable objects are at least partially disposed, respectively;

b) causing the first objects to contact the second objects respectively so as to move the second objects into a position in proximity or in contact with the one or more abutting surfaces; and c) retaining the first objects in a position within the first bores so as to retain the second objects in the position in proximity or in contact with the one or more abutting surfaces.

* * * * *